H. C. NEAL.
AIRPLANE.
APPLICATION FILED MAY 23, 1919.

1,338,247.

Patented Apr. 27, 1920.
6 SHEETS—SHEET 1.

Fig.1.

WITNESSES

INVENTOR
HENRY C. NEAL,
BY
ATTORNEYS

H. C. NEAL.
AIRPLANE.
APPLICATION FILED MAY 23, 1919.

1,338,247.

Patented Apr. 27, 1920.
6 SHEETS—SHEET 3.

Inventor
HENRY C. NEAL,

By *[signature]*,
Attorney

UNITED STATES PATENT OFFICE.

HENRY CLAY NEAL, OF PHILADELPHIA, MISSISSIPPI.

AIRPLANE.

1,338,247.  Specification of Letters Patent.  Patented Apr. 27, 1920.

Application filed May 23, 1919. Serial No. 299,185.

*To all whom it may concern:*

Be it known that I, HENRY C. NEAL, a citizen of the United States, and a resident of Philadelphia, in the county of Neshoba and State of Mississippi, have invented certain new and useful Improvements in Airplanes, of which the following is a specification.

My invention relates to improvements in airplanes, and it consists in the constructions, combinations and arrangements herein described and claimed.

An object of my invention is to provide an airplane embodying certain novel features of construction as will hereinafter be fully pointed out, whereby the airplane acts as a parachute in the event that the engine stops, so that the aviator may safely land on the ground.

A further object of the invention is to provide an airplane with mechanism capable of such adjustment and operation while the machine is in motion, to enable the airplane to remain in substantially one position to facilitate observations.

A further object of the invention is to provide an airplane constructed like and operating at times on the principle of a helicopter, designed to remain vertical or in its normal position, when standing on the ground, and while in motion, either ascending, descending or flying horizontally.

Other objects and advantages will appear in the following specification, reference being had to the accompanying drawings, in which:

The construction comprises generally a cage or car 1 of any suitable design and construction, in which the lower tubular mast 2 is suitably mounted at 3. A propeller frame 4 is suitably supported at 5 on the lower mast 2, and includes upper and lower braces 6 and 7, by means of which the propeller frame is rigidly held in place.

Figure 1:
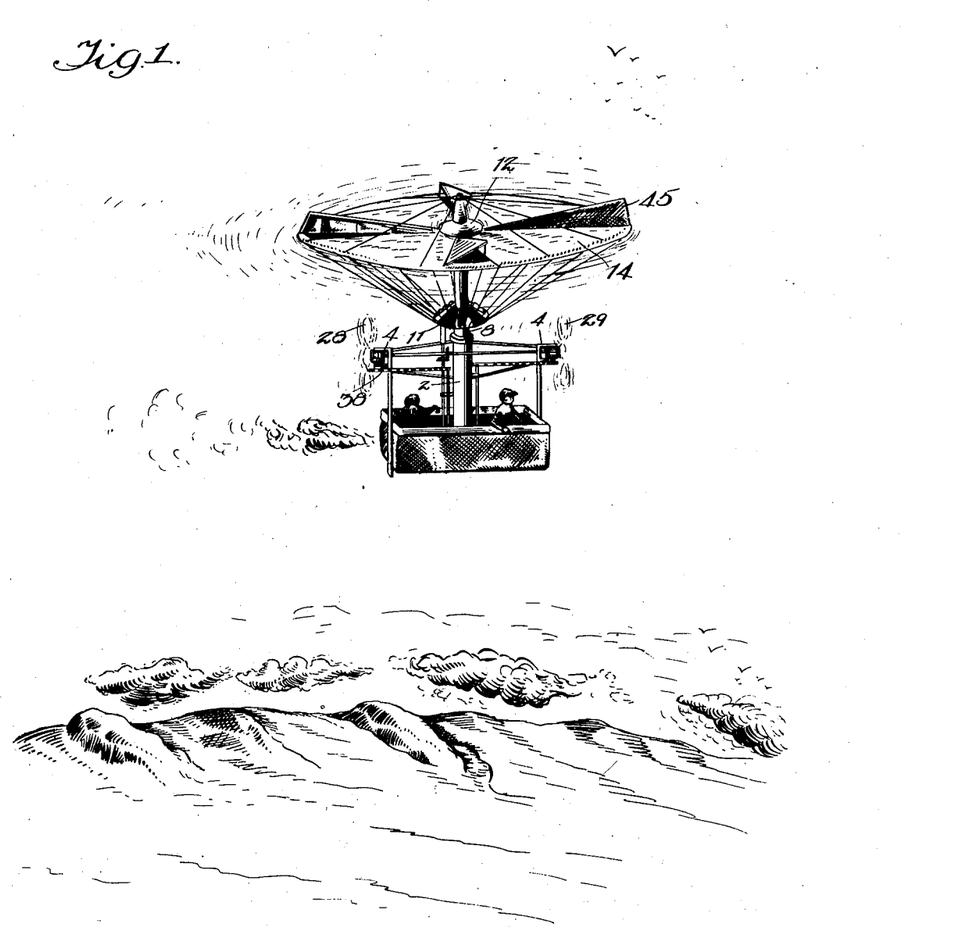
Figure 1 is a perspective view of an airplane constructed in accordance with my invention.
Figure 2:
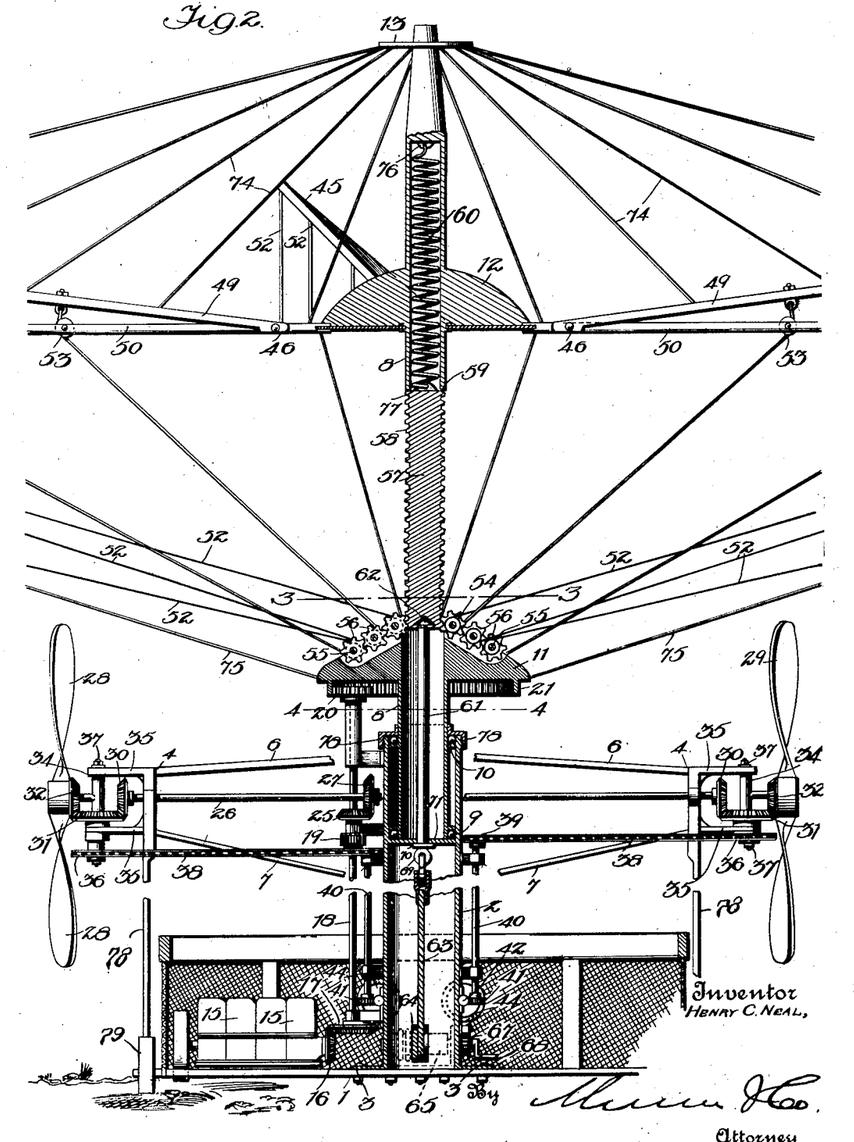
Fig. 2 is a vertical section taken through the center of the airplane and showing various important features of construction hereinafter described.

Telescopically mounted within the lower tubular mast 2 is the upper mast 8 which is capable of revolving within the mast 2, and for this purpose anti-friction devices 9 and 10, of any suitable structure, are provided respectively on the upper mast 8 and lower mast 2, as clearly shown in Fig. 2.

The upper mast is relatively long as can be plainly seen from Fig. 2, and has suitably attached thereto at proper intervals, a drum hub 11, a plane hub 12 and a brace hub 13 at the upper extremity. Suitably mounted on the upper revoluble mast 8 is a large circular plane 14 which is intended to revolve continuously while the airplane is in proper flying order in the air, one of the principal advantages derived from this continuous rotation being, that the centrifugal action operates to sustain the airplane in the normally erect position so that the possibility of the upsetting of the airplane, or tilting thereof to a dangerous degree, is altogether avoided.

There is one circumstance in which the circular plane does not act in the manner and for the purpose just stated, namely, when the aviator experiences trouble with the engine and the engine stops. When this occurs, the rotation of the circular plane also stops, but at this time the circular plane is adapted to act as a parachute, to so retard the descending movement of the airplane as to land the airplane and aviator safely on the ground. All of the foregoing features are stated simply to give the reader a general idea of the main parts of construction and of some of the methods of operation, but now in order that the construction and operation of all of the parts may be fully understood, attention is directed to the mechanism employed in

Making an ascent.

An engine 15 of any suitable type and mounted in the car 1, has a gear 16 on the crank shaft which meshes with the gear 17 of the main drive shaft 18. This shaft has an intermediate gear 19 and a pinion 20 at the upper extremity.

The pinion 20 meshes with the internal gear rim 21 of the drum hub 11, and causes the circular plane 14 to revolve by virtue of the rotation of the upper mast 8. The gear 19 meshes with a pinion 22 on a stub shaft 23 journaled in a suitable bracket 24, the shaft 23 having a gear 25 at the other end, by means of which the propeller countershaft 26 is driven through the medium of the connecting gear 27.

It is to be observed that the propeller countershaft 26 crosses the main drive shaft 18 at right angles as shown in Fig. 2. This arrangement being present, makes it necessary to provide the intermediate gear connections 19 and 22 to bring the driving gears 25 and 27 in the proper operating plane. The front and rear propellers 28, 29 are made to revolve simultaneously with the rotation of the circular plane 14, by means of the gear connections at the extremities of the propeller frame 4.

These gear connections each include a driving gear 30 on the adjacent extremity of the countershaft 26, which meshes with an idler 31 and ultimately drives the driven gear 32 of the companion propeller 28 or 29, as the case may be. The construction of the propeller driving mechanism at each end, it will be observed, is precisely alike.

Figure 10:
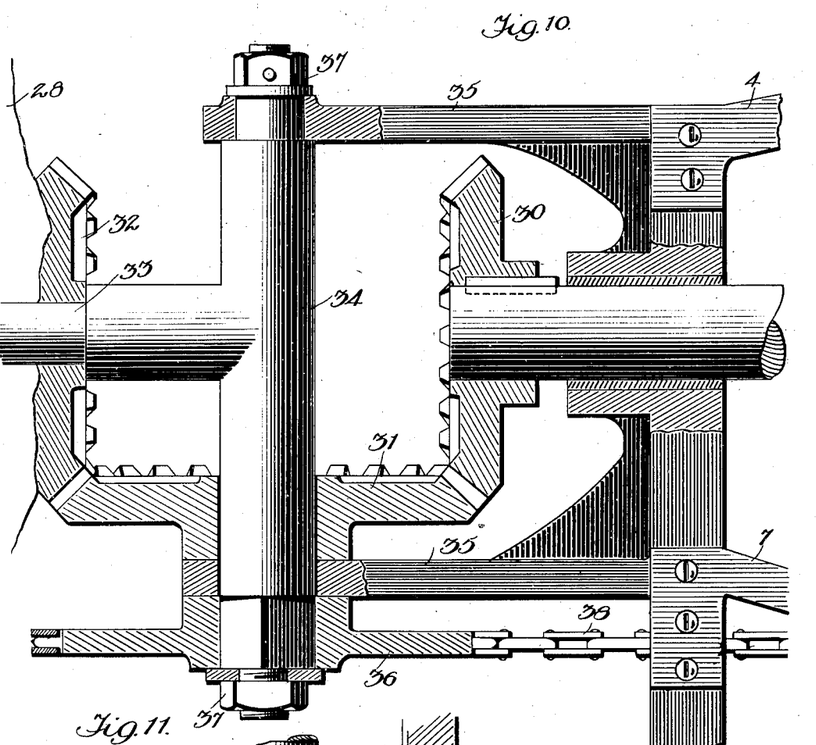
Fig. 10 is a detail sectional view of one of the propeller drive mechanisms.
Figure 11:
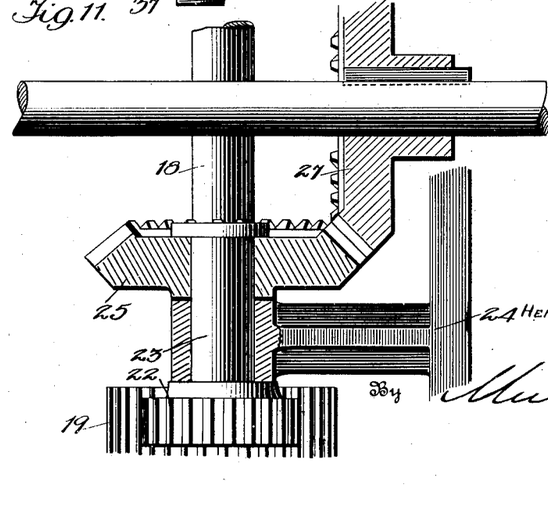
Fig. 11 is a detail view showing how the propeller countershaft is driven from the main drive shaft.

By reference to Fig. 10, one of the constructions can be seen more easily. Here the propeller 28 is shown to be revolubly mounted on the axle 33 of a supporting elbow or knuckle 34. The knuckle 34 is movably or adjustably mounted in the brackets 35 of the propeller frame 4, this movement or adjustment of the knuckle being only to a limited extent and sufficient to bring the propeller 28 either to the front nearest the observer or to the back, as the particular requirement may make necessary.

But before describing the mode of adjustment of the propeller, it is first to be observed that the idler 31 is simply mounted loosely on the lower end of the knuckle 34 and adjacent to the lower bracket 35, thereby serving to transmit the motion of the driving gear 30 to the driven gear 32 without influencing the knuckle 34 in any way. The lower end of the knuckle 34 is made non-circular and carries the adjusting sprocket 36, which upon movement, turns the propeller 28 into the positions above referred to. Suitable fastening devices 37 at each end of the knuckle 34, serve to respectively retain the knuckle in place in the bracket and to prevent the adjusting sprocket 36 from dropping off.

The mechanism necessary to effect the adjustment of the propellers 28, 29 in each case comprises a sprocket chain 38 which at one end is applied to the sprocket 36, extends inwardly and is applied to a companion sprocket 39 on the upper end of an adjusting shaft 40. There are two of the adjusting shafts. The propeller adjusting mechanism is separate for each propeller and consequently the propellers are capable of independent adjustment so that the propeller 28 at the left can be moved to the front to face the observer, and the propeller 29 at the right be moved in the other direction away from the observer.

Figures 3, 4, 5:
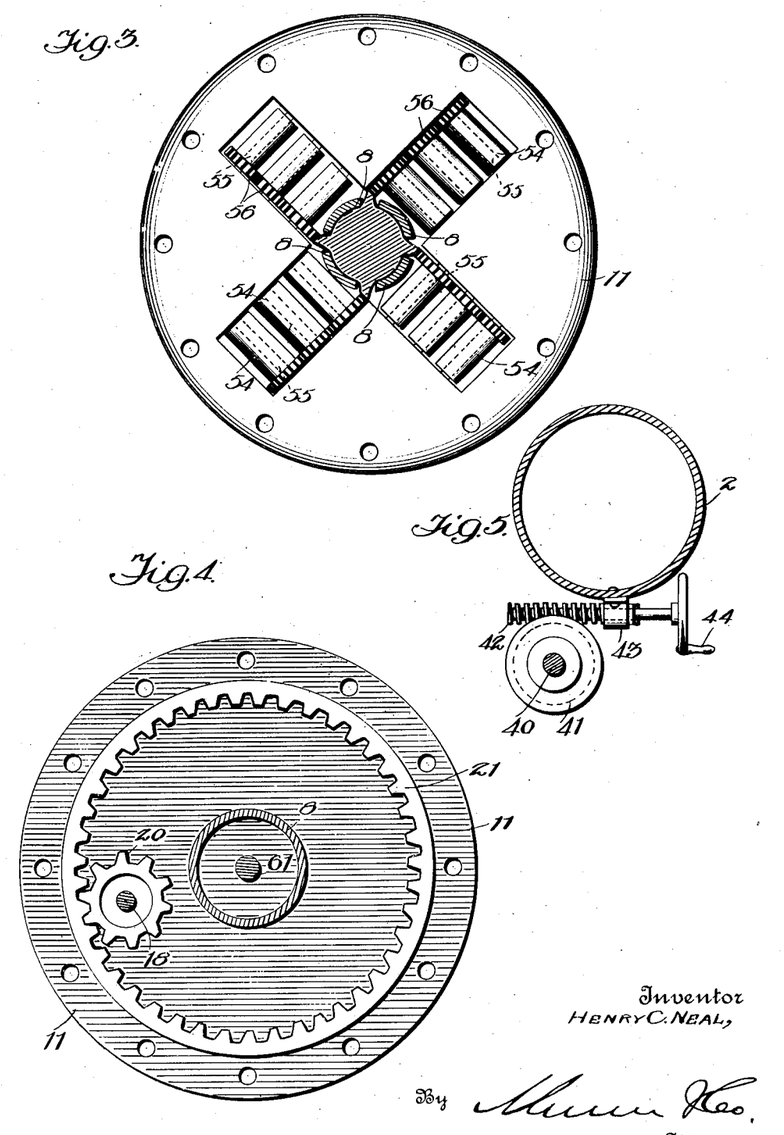
Fig. 3 is a cross section on the line 3—3 of Fig. 2.
Fig. 4 is a cross section on the line 4—4 of Fig. 2.
Fig. 5 is a detail view of a part of certain adjusting mechanism.

It is necessary to fix this adjustment of the propellers in ascending, so that by the reverse operation of the propellers, the tendency of the mast 2 and entire car 1 to turn by virtue of the reactionary movement of the revolving upper mast 8, is counteracted, and no movement of the car 1 results. Returning again to the adjusting shafts 40, each shaft has a worm gear 41 on the bottom, which meshes with a worm pinion 42, which in turn is suitably journaled at 43 on the mast 2 and is capable of being turned by means of the crank handles 44. This structure is clearly shown in Figs. 2 and 5.

Without further explanation, it can readily be understood that the necessary adjustment of the propellers 28, 29 is effected by turning one or the other of the crank handles 44. So far as described, the reader can understand how the propellers 28 and 29 are made to turn and how the circular plane 14 is made to revolve continuously while the airplane is in flight.

Figure 6:
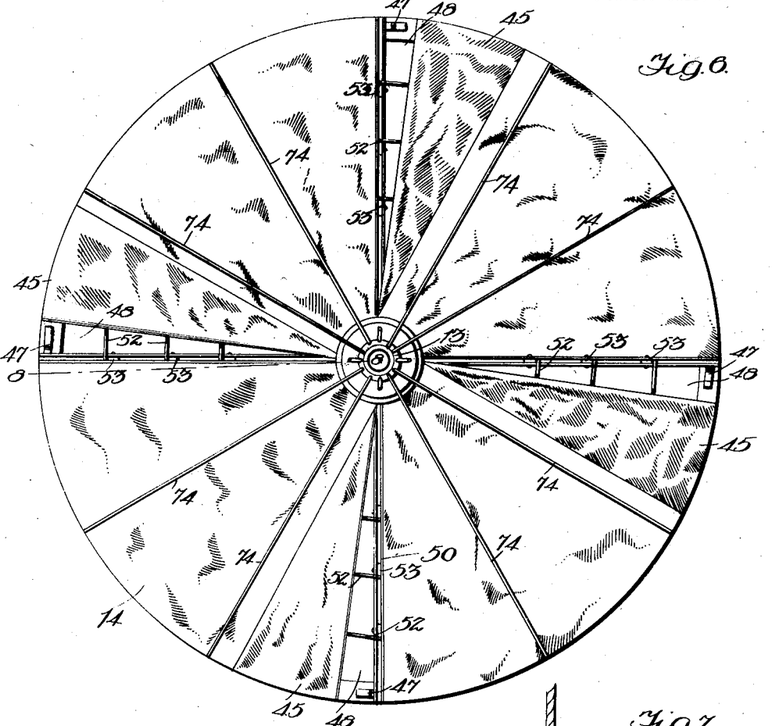
Fig. 6 is a plan view of the circular plane.
Figure 7:
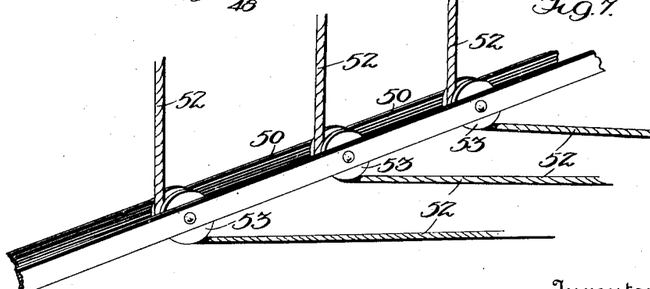
Fig. 7 is a detail perspective view of a part of the elevating plane controlling mechanism.
Figures 8, 9:
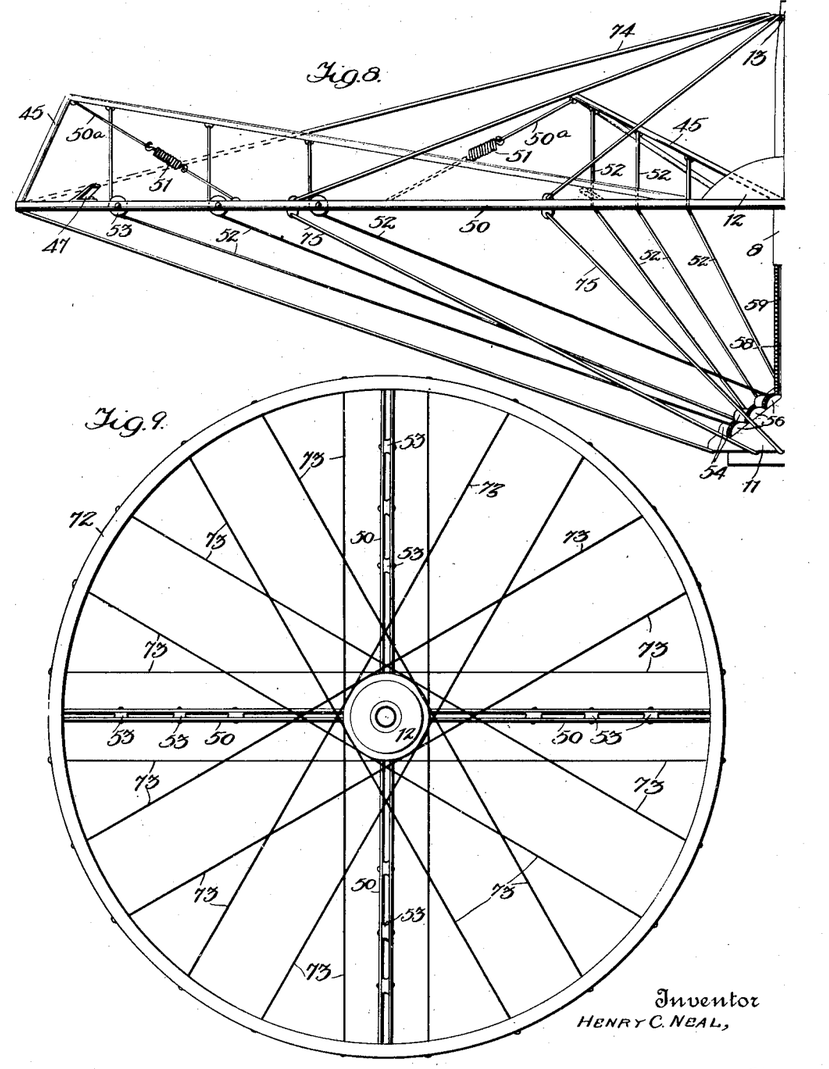
Fig. 8 is a detail section taken substantially on the line 8—8 of Fig. 6.
Fig. 9 is a plan view of the frame of the circular plane.

In order to make the airplane ascend vertically, a plurality of lifting planes 45 of substantially triangular shape, as shown in Fig. 6, are suitably hinged or otherwise mounted at 46 on the circular plane 14, and are capable of vertical movement with respect to the plane in accordance with certain circumstances. Normally, these planes 45 rest on suitable supports 47, which may consist of the bent leaf springs shown, so that the leading edges of the lifting planes are high enough above the top of the plane 14 to catch the air and cause the vertical lifting of the airplane.

The lifting planes 45 can be made to entirely close the openings 48 which correspond thereto in shape, the supporting means 47 being pressed flat under such circumstances. This function, however, is performed only in the event the engine 15 stops altogether, and the aviator desires to turn the plane 14 into a parachute to land in safety on the ground. Obviously, by closing the openings 48, the plane 14 presents a flat closed surface which acts with considerable resistance on the air beneath and thus retards the fall of the airplane.

The hinged mounting of each lifting plane 45 is shown more clearly in Fig. 2, wherein it is to be observed that the leading edge of the plane comprises the bar 49 of the plane frame, which is hinged on an adjacent part of a bracket spoke 50. The bracket spokes are equal in number to the lifting planes, and in the present instance, for purposes of illustration, only four of the planes are shown.

As soon as the circular plane 14 begins to revolve, the lifting planes 45 automatically rise from the resilient supports 47. A plane bracing wire $50^a$ with a coil spring 51, prevents the plane 45 from rising too suddenly. In fact, the rising movement beyond a certain predetermined point, which may be the extreme elevation to which the plane 45 is intended to rise, is limited by the bracing wire $50^a$.

However, all of the lifting planes 45 are under the control of the operator, who can make the proper adjustment to make the planes rise to any predetermined height, or can close them down altogether if he desires to do so. The mechanism for controlling the lifting planes 45 includes controlling cables 52 which run over loose idlers 53 in the spokes 50, and are respectively wound on independent drums 54 which are suitably journaled or mounted on shafts 55 in the drum hub 11.

Mounted on one end of each drum 54 is a gear 56. All of the gears mesh as clearly shown in Figs. 2 and 3, and consequently all of the drums turn together. This turning movement of the drums is, however, in directions opposite to each other and so it becomes necessary to apply the controlling cables 52, first on one side and then on the other, of the respective drums, so that the rotation of the drums as stated, will cause the closing of the lifting planes 45. A quaternary rack 57, so called because of the provision of the four racks 58 which extend through and operate in slots 59 in the upper mast 8, serve to operate the various gear trains in Fig. 3 so as to cause the simultaneous turning of all of the drums 54 for the purpose of closing or opening the lifting planes 45, as may be desired.

An equalizing spring 60, housed in the upper tubular part of the mast 8, normally sustains the rack 57 in the uppermost position. A slide rod 61, swiveled to the rack 57 at 62, has a cable 63 connected thereto at the bottom, for the purpose of pulling the rack 57 down against the tension of the spring 60, and turning all of the gears 56 and drums 54 at once. The cable 63 passes out of the mast 2 through a slot 64 and winds on a drum 65, with pawl and ratchet devices 66, 67 for holding the adjusted positions, and a handle 68 for its operation.

An eye 69 provides the fastening means for the cable 63. The eye is surmounted by a collar 70 which normally abuts a partition 71 in the bottom of the mast 8, and prevents further upward movement of the slide rod 61 and rack 57 by virtue of the contraction of the spring 60. One of the important purposes of the spring 60 is, to relieve the lifting planes 45 of the weight of the rack 57.

Digressing briefly, in order to bring in certain details of construction associated with the parts above described, the main circular plane 14 comprises a rim 72 which is sustained principally by the spokes 50 and also by a plurality of wire spokes 73, all of which radiate from the hub 12 and are suitably attached to the rim. The spokes 50 are made double so as to provide mountings and housings for the sheaves or pulleys 53.

A suitable covering incloses the plane 14 on both sides and is arranged to include the lifting planes 45, so as to present a smooth surface throughout. Brace wires 74 from the upper hub 13, and brace wires 75 to the lower hub 11, all assist in supporting the main plane 14 in proper position.

Ears 76 and 77, at the head of the bore of the mast 8 and on top of the quaternary rack 57 respectively, as shown in Fig. 2, form the attachments for the equalizing spring 60. The swivel connection 62 of the slide rod 61 with the rack 57, may be of any suitable design and is not confined to the form shown in Fig. 2. It is important to observe that the container of the upper anti-friction device 10 includes a cap 78 which is screwed down on the mast 2 and serves as a cover for the open end thereof.

*Flying horizontally.*

The operator now gradually changes the relative positions of the propellers 28, 29, as he reaches the desired elevation. If he desires to fly forwardly, that is to say toward the observer, in Fig. 2, he gradually moves the right-hand propeller 29 around to the front so that both propellers are to the front and the airplane is drawn through the air on the tractor principle.

At the same time, the lifting planes 45 are lowered far enough to prevent any further material elevation. The lowering of these planes is accomplished simultaneously by turning the handle 68 of the drum 65, thus pulling on the cable 63 and slide rod 61, to lower the quaternary rack 57 against the tension of the spring 60, and turning all of the gears 56. By winding up the cables 52 on the drums 54, the lifting planes 45 are pulled down.

During the entire foregoing operation, the propellers 28, 29 and plane 14 are driven continuously from the engine 15 through the medium of the main drive shaft 18 and propeller countershaft 26. These driving connections, as already stated, include the gears 16, 17, the intermeshing gears 27, 25, and the upper pinion 20 with its internal gear rim 21.

*Remaining still in mid-air.*

The speed of the engine 15, the propellers 28, 29 and lifting planes 45 can be so adjusted that the airplane will remain substantially in one position in mid-air to facilitate observation by the aviator or observer. This function is accomplished very much on the order of the principle of the resolution of forces, that is to say, by properly adjusting the speed of the engine and adjusting the lifting planes 45 to correct positions, a point will be reached where there will be very little lifting effort of the airplane so that it will hang suspended in the air approximately in one position. Although the propellers 28, 29 may assist in attaining this object, still the lifting planes 45 are largely instrumental in attaining this end.

*Acting as a parachute.*

Should any engine trouble suddenly develop, or other difficulties arise that it may be necessary for the aviator to reach the ground, he will quickly operate the drum 65 by turning the handle 68, so as to wind up the cable 63, to move the slide rod 61 and quaternary rack 57 down, and thereby turn all of the drums 54 simultaneously, wind up the cables 52 and entirely close the lifting planes 45. The main circular plane 14 then presents an unbroken surface underneath, that is to say, all of the openings 48 are closed, thereby obtaining a great resistance on the air and consequently retarding the falling movement of the airplane.

In conclusion, it should be observed that means is provided for supporting the airplane while on the ground. This means is shown in Fig. 2 as consisting of legs 78 reaching from the propeller frames to the ground. They are also suitably arranged at 79 so as to enable fastening thereof to the car of the airplane, for the obvious purpose of stabilizing the legs.

While the construction and arrangement of the airplane as herein described and claimed is that of a generally preferred form, obviously modifications and changes may be made without departing from the spirit of the invention or the scope of the claims.

I claim:—

1. An airplane, comprising a main revolving sustaining plane with a plurality of openings, a movable lifting plane operatively associated with each opening, means carried by the main plane and coöperating with a portion of said lifting plane to enable the lifting planes to rise from the openings when the main plane begins to revolve, means for limiting the opening movement of said planes, and manually controlled means for adjusting said lifting planes while the main plane is in revolution.

2. An airplane, comprising a main revoluble plane with a plurality of openings, a movable lifting plane operatively associated with each opening, and means carried by the main plane for initially holding the leading edges of the lifting planes up while the main plane is dormant.

3. An airplane, comprising a revoluble plane with a plurality of openings, a movable lifting plane hingedly mounted and normally occupying each opening while the main plane is dormant, resilient means operatively associated with the leading edge of each lifting plane initially holding the leading edge up and enabling the lifting plane to rise out of the opening when the plane begins to revolve, and manually operated means for subsequently simultaneously drawing all of said lifting planes into said openings, compressing said resilient means, to entirely close the revoluble plane.

4. An airplane, comprising a main revoluble plane with a plurality of openings, a movable hingedly mounted lifting plane normally occupying each opening while the main plane is dormant, resilient means carried by the main plane and normally presenting the leading edge of each lifting plane to the air to enable rising, limiting means between the lifting planes and main plane, each including a resilient element; and flexible manually operated means for simultaneously adjusting all of said lifting planes with respect to the main plane, or drawing them entirely into said opening against the tension of said resilient leading edge supporting means.

5. An airplane, comprising a main revoluble supporting plane, including a rim, spokes and a covering arranged to leave a plurality of openings, a movable lifting plane including a frame with a leading edge hinged in each opening, with a covering in continuation of the main plane covering, resilient means carried by the rim normally presenting each leading edge tightly above the main plane while the lifting planes are dormant in said openings, means including resilient elements for limiting the rising of said lifting planes when the main plane begins to revolve, and manually controlled flexible means joining each lifting plane, for simultaneously adjusting all of said lifting planes for drawing them into said openings against the compression of said resilient means, to present a continuous unbroken main plane surface.

6. An airplane, comprising a lower relatively stationary tubular mast, an upper hollow mast journaled in the lower mast, means for revolving the upper mast, a circular main sustaining plane with a plurality of openings carried by the upper mast, a movable lifting plane operatively associated with each opening, for causing the airplane to ascend vertically when the main plane is in revolution; and means operatively embodied in the upper mast independently of the lower mast, capable of manual operation while the upper mast and plane are in rotation, to simultaneously adjust all of the lifting planes with respect to the main plane and openings.

7. An airplane, comprising a main revoluble sustaining plane with a plurality of openings, a movable lifting plane operatively associated with each opening, means for limiting the rising movement of said lifting planes in the rotation of the main plane, and means for adjusting the lifting planes with respect to the main plane and openings during rotation, comprising an axially mounted and operable rack, with companion geared drums with flexible connections to said lifting planes.

8. An airplane, comprising a tubular slotted mast with a main sustaining plane, a plurality of lifting planes operatively mounted on the main frame, operating means for adjusting the positions of the lifting planes with respect to the main plane, and actuating means for said operating means, including a member axially movable in the tubular mast with operating portions extending through the slots.

9. An airplane, comprising a tubular slotted mast, a main sustaining plane mounted thereon, a plurality of movable lifting planes operatively mounted on the main frame, operating means for controlling the adjustment of said planes while the airplane is in motion, manually controlled means movable in the tubular mast with actuating portions occupying the slots to engage said operating means, and means operatively combined with said actuating means and said mast for automatically returning said actuating means when released from manual control.

10. An airplane, comprising a revoluble tubular mast with slots, a main circular sustaining plane with openings mounted on said mast, a lifting plane movably and adjustably mounted in each opening, revoluble operating means with connections to said lifting plane to regulate the adjustment thereof while the main plane is in rotation, manually controlled actuating means in the tubular mast with actuating portions extending through the slots and engaging said revoluble means, and means operatively associated with said actuating means and the mast for automatically returning said means to the original position when released from manual control.

11. A revoluble mast with a main circular sustaining plane having openings, a movable lifting plane adjustable in each opening, movable means carried by the mast with adjusting connections to the respective lifting planes, actuating means for said movable means carried by and revolving with said mast, and relatively stationary manually operated means including drum, cable and swivel connections to said actuating means, for simultaneously actuating all of said movable means and consequently adjusting all of said lifting planes while the mast and main plane are in rotation.

12. A tubular slotted mast with a circular main sustaining plane having a plurality of openings, a movable lifting plane adjustably mounted in each opening, operating means including a gear and drum carried by the mast for each lifting plane with operating connections thereto, and manually controlled axially movable actuating means in said tubular mast with racks extending through the slots to engage the several gears and enable the manual adjustment of the lifting planes while the main plane is in rotational movement.

13. A tubular mast with slots and a hub, a main circular sustaining plane with openings mounted to revolve with the mast, a movable lifting plane adjustably mounted in each opening, a plurality of drums with intermeshing gears, for each lifting plane, mounted in the hub with adjusting connections from the drums to each lifting plane at a plurality of places; movable actuating means for the drums in the mast, including racks occupying the slots and engaging one of each intermeshing gear train; relatively stationary operating means swiveled to said actuating means, and means operatively combined in said actuating means and mast for returning said actuating means to the normal position when released.

14. An airplane, comprising a car with a lower tubular fixed mast, an upper tubular slotted mast with a main circular sustaining plane with openings, revolubly journaled in the lower mast; a movable lifting plane adjustably mounted in each opening, mechanism in the car operatively connected for revolving the upper mast and plane, movable means with operating connections to the several lifting planes, a movable actuating member in the upper mast including actuating portions in the slots operatively associated with said moving means, for simultaneously adjusting all of said lifting planes during rotation of the main plane, manually controlled means joining the actuating means with operating means therefor on the outside of the lower mast, and means for automatically returning said actuating means to the normal position when released by said manually controlled means.

15. In an airplane, a propeller frame terminating in bracket extremities, fore and aft propellers each including a knuckle mounted in the brackets, common driving means for both propellers, including an idler gear journaled on each knuckle with driving connections to the respective propellers; and manually operated means for independently adjusting the knuckles in the brackets, including hand operated gear and chain connections.

16. In an airplane, a relatively stationary lower tubular mast with a partition, an upper mast with bearing means journaled in the lower mast above said partition, a circular main sustaining plane with a plurality of openings carried by the upper mast, a movable lifting plane adjustably mounted in each opening, operating means with connections to each lifting plane, carried by the upper mast; means for actuating said movable means, mounted in the upper mast; a slide rod with a swivel connection to said actuating means, passing through the partition and having an eye with a collar engaging beneath the partition, a flexible operating connection to the eye, passing through the stationary mast; and an operating drum receiving said flexible connection, with pawl and ratchet devices for holding certain adjustments of the drum.

17. In an airplane, a car having a fixed lower mast with a propeller frame, and supporting means, including legs reaching from the propeller frame, engaging the car and touching the ground to provide lateral support while the airplane is on the ground.

HENRY CLAY NEAL.